United States Patent
Dhanawat et al.

(10) Patent No.: US 10,445,417 B2
(45) Date of Patent: Oct. 15, 2019

(54) ENTRY OF VALUES INTO MULTIPLE FIELDS OF A FORM USING TOUCH SCREENS

(71) Applicant: Oracle International Corporation, Redwood Shores, CA (US)

(72) Inventors: Vineet Dhanawat, Jaipur (IN); Govinda Raj Sambamurthy, Bangalore (IN)

(*) Notice: Subject to any disclaimer, the term of this patent is extended or adjusted under 35 U.S.C. 154(b) by 422 days.

(21) Appl. No.: 13/956,396

(22) Filed: Aug. 1, 2013

(65) Prior Publication Data

US 2015/0039989 A1 Feb. 5, 2015

(51) Int. Cl.
*G06F 17/00* (2019.01)
*G06F 17/24* (2006.01)
(Continued)

(52) U.S. Cl.
CPC ........... *G06F 17/243* (2013.01); *G06F 3/017* (2013.01); *G06F 3/0488* (2013.01);
(Continued)

(58) Field of Classification Search
CPC .......... G06F 15/16; G06F 3/033; G06F 3/041; G06F 17/243; G06F 17/242;
(Continued)

(56) References Cited

U.S. PATENT DOCUMENTS

| | | | | |
|---|---|---|---|---|
| 6,589,290 B1 * | 7/2003 | Maxwell | ............. | G06F 17/2247 715/224 |
| 6,651,217 B1 * | 11/2003 | Kennedy | ............... | G06F 17/243 715/224 |

(Continued)

FOREIGN PATENT DOCUMENTS

| | | |
|---|---|---|
| EP | 2472393 A3 | 12/2009 |
| EP | 2113851 A1 | 11/2012 |

(Continued)

OTHER PUBLICATIONS

Chrome Blog, "A faster way to fill out forms", Google, 2009, 2 pages https://chrome.googleblog.com/2009/04/faster-way-to-fill-out-forms.html.*

(Continued)

*Primary Examiner* — Cesar B Paula
*Assistant Examiner* — David Faber
(74) *Attorney, Agent, or Firm* — IPHorizons PLLC; Narendra Reddy Thappeta

(57) ABSTRACT

An aspect of the present disclosure facilitates users of touch screens to conveniently provide values for fields of a form. In an embodiment, a mapping is maintained to map symbols to corresponding profiles, with each profile being defined to specify a respective value for each of a corresponding set of fields. A form is sent for display on a touch screen, and a user is permitted to perform a touch action constituting a sequence of touch points (and representing input symbol) on the touch screen. The mapping is examined to determine a first symbol matching the input symbol, and a first profile corresponding to the first symbol is identified. The form is then auto-filled with values specified by the first profile. The user can continue interaction with the form with such auto-filled values.

20 Claims, 11 Drawing Sheets

(51) Int. Cl.
*G06F 3/01* (2006.01)
*H04L 29/08* (2006.01)
*G06F 3/0488* (2013.01)
*H04N 1/00* (2006.01)
*G06F 16/9535* (2019.01)

(52) U.S. Cl.
CPC ........ *H04L 67/306* (2013.01); *G06F 3/04883* (2013.01); *G06F 16/9535* (2019.01); *G06F 17/242* (2013.01); *G06F 2203/04808* (2013.01); *H04N 1/00501* (2013.01); *H04N 1/00509* (2013.01)

(58) Field of Classification Search
CPC .... G06F 3/0488; G06F 3/04883; G06F 3/017; G06F 9/00402; G06F 2203/04808; G06Q 30/02; H04L 67/306
USPC .......................................... 715/226; 709/203
See application file for complete search history.

(56) References Cited

U.S. PATENT DOCUMENTS

| | | | |
|---|---|---|---|
| 7,343,551 B1* | 3/2008 | Bourdev | G06F 17/243 715/224 |
| 8,086,651 B2 | 12/2011 | Thomas | |
| 8,266,648 B2* | 9/2012 | Olague | H04N 5/44543 725/25 |
| 8,291,350 B1 | 10/2012 | Park et al. | |
| 8,341,558 B2 | 12/2012 | Li | |
| 8,358,281 B2 | 1/2013 | Mccullough et al. | |
| 8,635,560 B2* | 1/2014 | Drader | G06F 1/3215 345/173 |
| 8,751,535 B1* | 6/2014 | Kim | G06F 21/6245 707/784 |
| 9,318,108 B2* | 4/2016 | Gruber | G10L 15/1815 |
| 9,558,400 B2* | 1/2017 | Schwartz | G06K 9/00436 |
| 9,785,241 B2* | 10/2017 | Mason | G06F 3/017 |
| 2002/0023108 A1* | 2/2002 | Daswani | G06F 17/243 715/224 |
| 2004/0039754 A1 | 2/2004 | Harple, Jr. | |
| 2004/0205526 A1* | 10/2004 | Borodovski | G06F 17/243 715/224 |
| 2005/0198563 A1* | 9/2005 | Kristjansson | G06F 17/243 715/224 |
| 2005/0203931 A1 | 9/2005 | ngree et al. | |
| 2010/0131584 A1* | 5/2010 | Johnson | 709/203 |
| 2010/0182631 A1* | 7/2010 | King | G06F 17/243 358/1.15 |
| 2011/0066984 A1* | 3/2011 | Li | G06F 3/04883 715/863 |
| 2012/0150598 A1* | 6/2012 | Griggs | 705/14.16 |
| 2012/0239642 A1 | 9/2012 | Bliss et al. | |
| 2012/0293442 A1 | 11/2012 | Westerman et al. | |
| 2013/0046544 A1* | 2/2013 | Kay | G06F 3/04883 704/275 |
| 2013/0103712 A1 | 4/2013 | Li et al. | |
| 2013/0138426 A1 | 5/2013 | DelRocco et al. | |
| 2014/0123057 A1* | 5/2014 | Eigner | H04L 67/30 715/780 |
| 2014/0245120 A1* | 8/2014 | Schwartz | G06K 9/00402 715/226 |
| 2014/0258830 A1* | 9/2014 | Gormish | G06F 17/242 715/226 |
| 2015/0205776 A1* | 7/2015 | Bhatia | G06F 17/243 715/226 |
| 2019/0025950 A1* | 1/2019 | Kim | G06F 3/03545 |

FOREIGN PATENT DOCUMENTS

| | | |
|---|---|---|
| WO | 2007126996 A3 | 8/2008 |
| WO | 2008085791 A3 | 2/2009 |
| WO | 2012131056 A2 | 10/2012 |

OTHER PUBLICATIONS

Google Gesture Search, https://play.google.com/store/apps/details?id=com.google.android.apps.gesturesearch&feature=search_result, downloaded circa Jun. 28, 2013, pp. 1-2.
8 Pen application for Mobile, http://www.youtube.com/watch?v=q3OuCR0EpGom, video uploaded on Oct. 30, 2010.

* cited by examiner

| Form ID | Content ID | User ID | Revision | Author | Comments | Region | State | City | Country | Release Date | Expiration Date | CONTACT # |
|---|---|---|---|---|---|---|---|---|---|---|---|---|
| FRM_AA_HR | HR_FOREIGN | HR_USER1 | 01 | HR_USER1 | INTL_HR_POLICY | INTL | KAR | BLR | IN | 05/12/2011 | | |
| FRM_SALES_EAST | PROMOTION_JPH | SALES_USER3 | 02 | SALES_USER3 | SALES PROMOTION | EAST | S_EAST | EAS | | | | |
| FRM_CA_HR | POLICY_CAL | HR_USER1 | 00 | | EMPLOYEE PROMOTION | | | | | | | 411-11111 |

*FIG. 5*

| userId | Form ID | Gesture/Symbol | ProfileId |
|---|---|---|---|
| HR_USER1 | FRM_CA_HR | α | Employee-normal |
| HR_USER1 | FRM_AA_HR | δ | Employee-Foreign |
| HR_USER1 | FRM_CA_HR | ε | Employee-critical |
| SALES_USER1 | FRM_SALES_NORTH | β | SALES_NORTH |
| SALES_USER2 | FRM_SALES_SOUTH | γ | SALES_SOUTH |
| SALES_USER3 | FRM_SALES_EAST | λ | SALES_EAST |
| SALES_USER4 | FRM_SALES_WEST | σ | SALES_WEST |

Browser

Content Check-In Form

- *Form ID: FRM_CA_HR — 810
- *Type: Document - Any generic document
- Folder: [Browse...] [Clear] — 815
- Content ID: TRAINING_CAL
- *Security Group: DEV
- UserID: HR_USER1 — 820
- *Primary File: [Choose File] No file chosen
- Alternate File: [Choose File] No file chosen
- *Revision: 02 — 821
- Comments: — 822
- User Access List
- Group Access List
- apRoleAccessList
- Profile: No Selection
- apxFolder: No Selection
- apxHidden: No Selection
- apxReadOnly: No Selection
- apxInhibitMetadataUpdate: No Selection
- apxForceFolderSecurity: No Selection — 825
- *Author: — 826
- Country: No Selection — 827
- Region: North — 828
- State: — 829
- City: — 830
- Release Date: — 831
- Expiration Date: No Selection 840 — [SUBMIT] [Reset] [Quick Help]

FIG. 8B

Browser

Content Check-In Form

- *Form ID: FRM_CA_HR — 810
- *Type: Document -
- Folder: [signature image] — 850A
- Content ID: TRAINING_
- *Security Group: DEV
- UserID: HR_USER1
- *Primary File: [Choose File] No file chosen
- Alternate File: [Choose File] No file chosen
- *Revision: 02 — 821
- Comments: — 822
- User Access List
- Group Access List
- apRoleAccessList
- Profile: No Selection
- apxFolder: No Selection
- apxHidden: No Selection
- apxReadOnly: No Selection — 825
- apxInhibitMetadataUpdate: No Selection — 826
- apxForceFolderSecurity: No Selection — 827
- *Author: — 828
- Country: No Selection — 829
- Region: North — 830
- State: — 831
- City:
- Release Date:
- Expiration Date: No Selection 840 — [SUBMIT] [Reset] [Quick Help]

| Form ID 510 | Content ID 515 | User ID 520 | Revision 525 | Author 530 | Comments 535 | Region 540 | State 545 | City 550 | Country 555 | Release Date 560 | Expiration Date 565 | CONTACT # 570 |
|---|---|---|---|---|---|---|---|---|---|---|---|---|
| FRM_AA_HR | HR_FOREIGN | HR_USER1 | 01 | HR_USER1 | INTL_HR_POLICY | INTL | KAR | BLR | IN | 07/12/2011 | | |
| FRM_SALES_EAST | PROMOTION_JPH | SALES_USER3 | 02 | SALES_USER3 | SALES PROMOTION | EAST | S_EAST | EAS | | | | |
| FRM_CA_HR | POLICY_CAL | HR_USER1 | 00 | | EMPLOYEE PROMOTION | | CA | LA | | | | 411-11111 |
| FRM_CA_HR | TRAINIG_CAL | HR_USER1 | 02 | HR_USER1 | | | | | | 07/15/2012 | | |

*FIG. 9*

ENTRY OF VALUES INTO MULTIPLE FIELDS OF A FORM USING TOUCH SCREENS

BACKGROUND

Technical Field

The present disclosure relates to touch screen based user interfaces, and more specifically to facilitating users to enter values into multiple fields of a form using touch screens.

Related Art

Touch screens respond to touch operations (e.g., touch/tap, drag, swipe, pinch) of users using one or more of fingers, stylus, etc., and facilitates user interfaces with applications based on the touch operations, as is well known in the relevant arts.

There is often a need for users to fill forms. Forms are provided for purposes such as specifying metadata for content files, searching for desired files using metadata, classification of files, etc., as is also well known in the relevant arts.

A form contains multiple fields and the user is normally expected to enter values (text, number, combination of text/numbers, etc.) corresponding to respective fields. Each field may be viewed as containing an associated label (typically identifying or explaining the nature of value to be entered) and a location on the displayed form to enter/input the corresponding value.

Challenges are often presented while a user enters values into fields of a form displayed on touch screens. For example, small touch screens may be provided associated with portable computing devices and it may be challenging for users to select individual ones of the fields and enter corresponding values. Additional challenges are presented when fields are provided on touch screens using facilities such as drop down menus, etc., at least due to the availability of limited space on the small touch screens.

It is generally desirable that the user interface be simplified for users of touch screen based computing devices.

BRIEF DESCRIPTION OF THE DRAWINGS

Example embodiments of the present disclosure will be described with reference to the accompanying drawings briefly described below.

FIG. 5 depicts the metadata stored associated with respective files in an embodiment.

FIG. 6 depicts the profiles and associated symbols configured for various users in an embodiment.

FIG. 8A depicts a form initially displayed to a user on a touch screen in an embodiment.

FIG. 8B depicts a touch based gesture provided as an input by a user in an embodiment.

FIG. 8C depicts the values filled into the fields of the form, in response to a gesture, in an embodiment.

FIG. 8D depicts an alternative approach for filling values into fields of a form, in an embodiment.

FIG. 9 depicts the additional metadata stored in the tables of a server in an embodiment.

In the drawings, like reference numbers generally indicate identical, functionally similar, and/or structurally similar elements. The drawing in which an element first appears is indicated by the leftmost digit(s) in the corresponding reference number.

DETAILED DESCRIPTION

1. Overview

An aspect of the present disclosure facilitates users of touch screens to conveniently provide values for fields of a form. In an embodiment, a mapping is maintained to map symbols to corresponding profiles, with each profile being defined to specify a respective value for each of a corresponding set of fields. A form is sent for display on a touch screen, and a user is permitted to perform a touch action constituting a sequence of touch points (and representing input symbol) on the touch screen. The mapping is examined to determine a first symbol matching the input symbol, and a first profile corresponding to the first symbol is identified. The form is then auto-filled with values specified by the first profile. The user can continue interaction with the form with such auto-filled values.

Several aspects of the present disclosure are described below with reference to examples for illustration. However, one skilled in the relevant art will recognize that the disclosure can be practiced without one or more of the specific details or with other methods, components, materials and so forth. In other instances, well-known structures, materials, or operations are not shown in detail to avoid obscuring the features of the disclosure. Furthermore, the features/aspects described can be practiced in various combinations, though only some of the combinations are described herein for conciseness.

2. Example Environment

Figure 1:
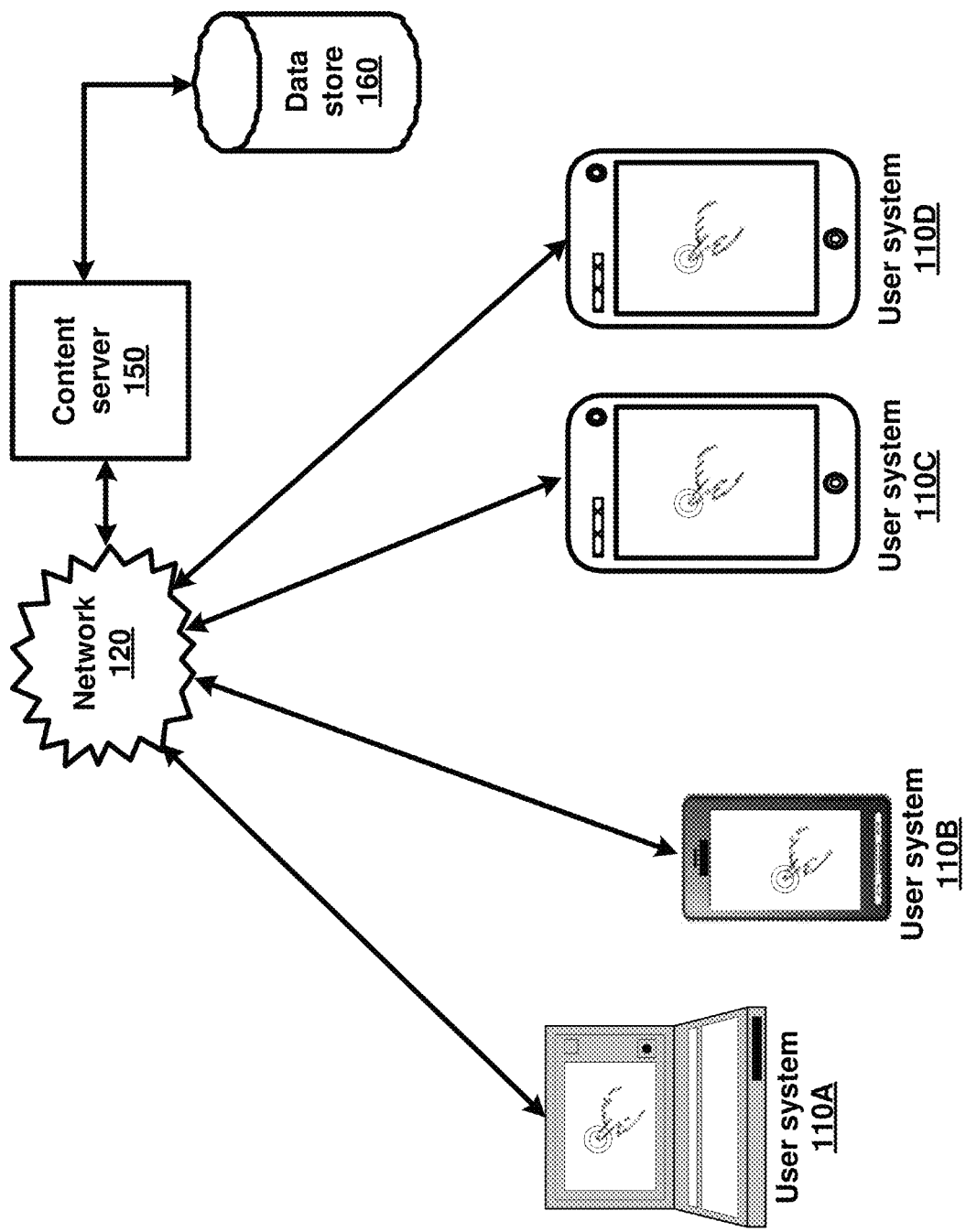
FIG. 1 is a block diagram illustrating an example environment in which several aspects of the present disclosure can be implemented.

FIG. 1 is a block diagram illustrating an example environment in which several aspects of the present disclosure can be implemented. The environment is shown containing user systems 110A-110D, content server 150, data store 160 and network 120.

Merely for illustration, only representative number/type of systems/data centers is shown in the Figure. Many environments often contain many more data centers, each in turn containing many more systems, both in number and type, and located geographically separately (but connected with each other via corresponding network paths depending on the purpose for which the environment is designed. Each system/device of FIG. 1 is described below in further detail.

Network 120 provides connectivity between each of user systems 110A-110D and content server 150. Network 120 may be implemented using protocols such as Transmission Control Protocol (TCP) and/or Internet Protocol (IP), well known in the relevant arts. In general, in TCP/IP environments, an IP packet is used as a basic unit of transport, with the source address being set to the IP address assigned to the source system from which the packet originates and the destination address set to the IP address of the destination system to which the packet is to be eventually delivered.

A (IP) packet is said to be directed to a destination/target system when the destination IP address of the packet is set to the (IP) address of the destination system, such that the packet is eventually delivered to the destination system by network 120. When the packet contains content such as port numbers, which specifies the destination application, the packet may be said to be directed to such application as well. The destination system may be required to keep the corresponding port numbers available/open, and process the packets with the corresponding destination ports. Network 120 may be implemented using any combination of wire-based, wireless, or combination of such mediums.

Data store 160 represents a corresponding non-volatile memory storage facilitating storage and retrieval of content files. Data store 160 may also store metadata associated with the content files. Data store 160 may be implemented using relational database technologies and therefore provide storage and retrieval of data using structured queries such as SQL (Structured Query Language). Alternatively, data store 160 may be implemented as a file store providing storage and retrieval of data in the form of one or more files organized as one or more directories, well known in the relevant arts.

Content server 150 implements a content management application, which enables users at user systems 110A-110D to manage content of interest. Each content portion may be represented in the form of a file, which is stored in data store 160. Management of content may imply storing each file (upon creation of the content), implementing access policies, and facilitating control of life cycle of the file, in general. Content server 150 may provide users the ability to specify metadata associated with such files, and the meta data is stored associated with the file in data store 160. Content server 150 may be implemented using, for example, Oracle WebCenter Content 11gR1, available from Oracle Corporation, the Applicant of the subject patent application.

Each of user systems 110A-110D may, for example, correspond to a personal digital assistant (PDA), a mobile phone, etc., having a touch screen. A user is shown performing a touch operation on each of the touch screens. As noted above, touch operations can be performed using one or more fingers, stylus, etc., though only a single finger is shown on each of the systems there for illustration. Though described as operating in conjunction with content server 150 in the examples below, a user system can be implemented as a stand-alone system with other applications using various features of the disclosure provided herein.

Each user system 110A-110D provides user interfaces facilitating users to manage content. For example, a user may take a photo (create content) and store the corresponding image as a file on content server 150. User system 110A-110D may receive a form associated with such storing, with the form containing various fields for providing values constituting metadata. Aspects of the present invention facilitate a user to simplify entry of such values, as described below in further detail.

3. Entry of Values into Multiple Fields of a Form

Figure 2:
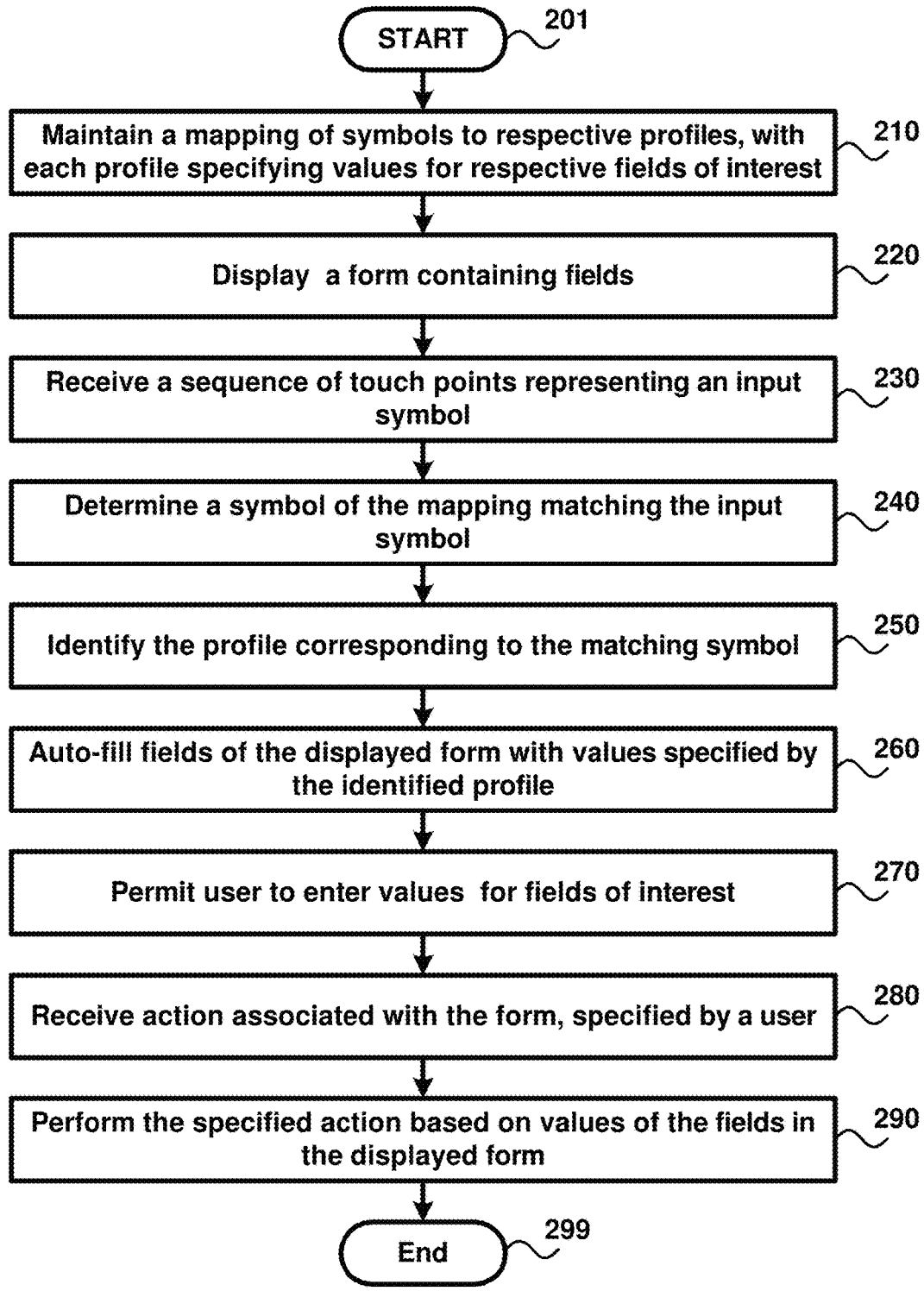
FIG. 2 is a flow chart illustrating the manner in which users are facilitated to enter values into multiple fields of a form according to an aspect of the present disclosure.

FIG. 2 is a flow chart illustrating the manner in which errors are handled according to an aspect of the present disclosure. The flowchart is described with respect to the systems of FIG. 1 merely for illustration. However, the features can be implemented in other environments also without departing from the scope and spirit of various aspects of the present disclosure, as will be apparent to one skilled in the relevant arts by reading the disclosure provided herein.

In addition, some of the steps may be performed in a different sequence than that depicted below, as suited to the specific environment, as will be apparent to one skilled in the relevant arts. Many of such implementations are contemplated to be covered by several aspects of the present disclosure. The flow chart begins in step 201, in which control immediately passes to step 210.

In step 210, content server 150 maintains a mapping of symbols to respective profiles, with each profile specifying values for respective fields of interest. Each symbol can be either one of pre-specified symbols (e.g., one of alphabet) or can be custom symbols that are arbitrary. In case of arbitrary symbols, each symbol may be represented in the form of a bit map.

In addition, each profile contains those groups of fields and corresponding values, as of interest in a specific context (e.g., combination of factors such as user, form, values already in the form, etc.). Thus, the sets of fields and/or corresponding values contained in each profile may be different than those in other profiles. Each user may be provided the flexibility to provide her/his profiles of interest, while an administrator can specify some profiles of common interest to all users.

In step 220, user system 110A displays a form containing fields. The form may be received from content server 150. Accordingly, after receipt of the form, a user may be required to provide desired values for one or more of the fields.

In step 230, user system 110A receives a sequence of touch points representing an input symbol. The touch points correspond to those points of touch screen which are touched, as a user draws a desired symbol. As may be appreciated, the drawing of an input symbol on a touch screen, represents a gesture by the corresponding user.

In step 240, user system 110A determines a symbol of the mapping matching the input symbol. Various techniques well known in the relevant arts may be employed for such a determination. For example, in case of symbols (of mapping) within a dictionary of pre-defined symbols (e.g., according to defined alphabets), the gesture may be examined for similarity with each of pre-defined symbols and upon exceeding a threshold degree of similarity with a given symbol, the input symbol is assumed to be that given symbol. The determined input symbol is then compared with the symbols of the mapping noted in step 210. Alternatively, if the symbols of the mapping are arbitrary, the general pattern of the gesture is compared with the bit map representation of the symbols of the mapping for similarity.

In step 250, user system 110A identifies the profile corresponding to the matching symbol based on the mapping. As may be appreciated, the identified profile would contain a corresponding set of fields and respective values.

In step 260, user system 110A auto-fills the fields (of the displayed form) specified in the identified profile, with the associated values also specified by the identified profile. Auto-filling implies that the values are incorporated into the form by operation of user system 110A, without requiring the user to input such values. The form may be refreshed on the touch screen such that the auto-filled values are displayed to the user.

In step 270, user system 110A permits a user to enter values for fields of interest, potentially overriding (editing) some of the auto-filled values (in addition to entering values for any fields not specified by the identified profile).

In step 280, user system 110A receives an action associated with the form, specified by a user. For example, the action may be to submit the values of the form, which causes the values to be processed. Assuming the values are received at content server 150 and the values represent metadata values, content server 150 stores the received metadata associated with the corresponding file. Accordingly, in step 290, content server 150 performs the specified action based on values of the fields in the displayed form. However, other actions such as processing the data for completing a transaction may be performed in other environments. The flow chart ends in step 299.

It may thus be appreciated that the features described above can be used to enter metadata values associated with the photo file noted above. However, FIG. 2 can be used in other contexts such as searching for desired files, classification of files, etc., in interfacing with content server 150. Alternative embodiments may be implemented to interface with forms of other types of applications also.

The description is continued with further details of example embodiments.

4. Server System

Figure 3:
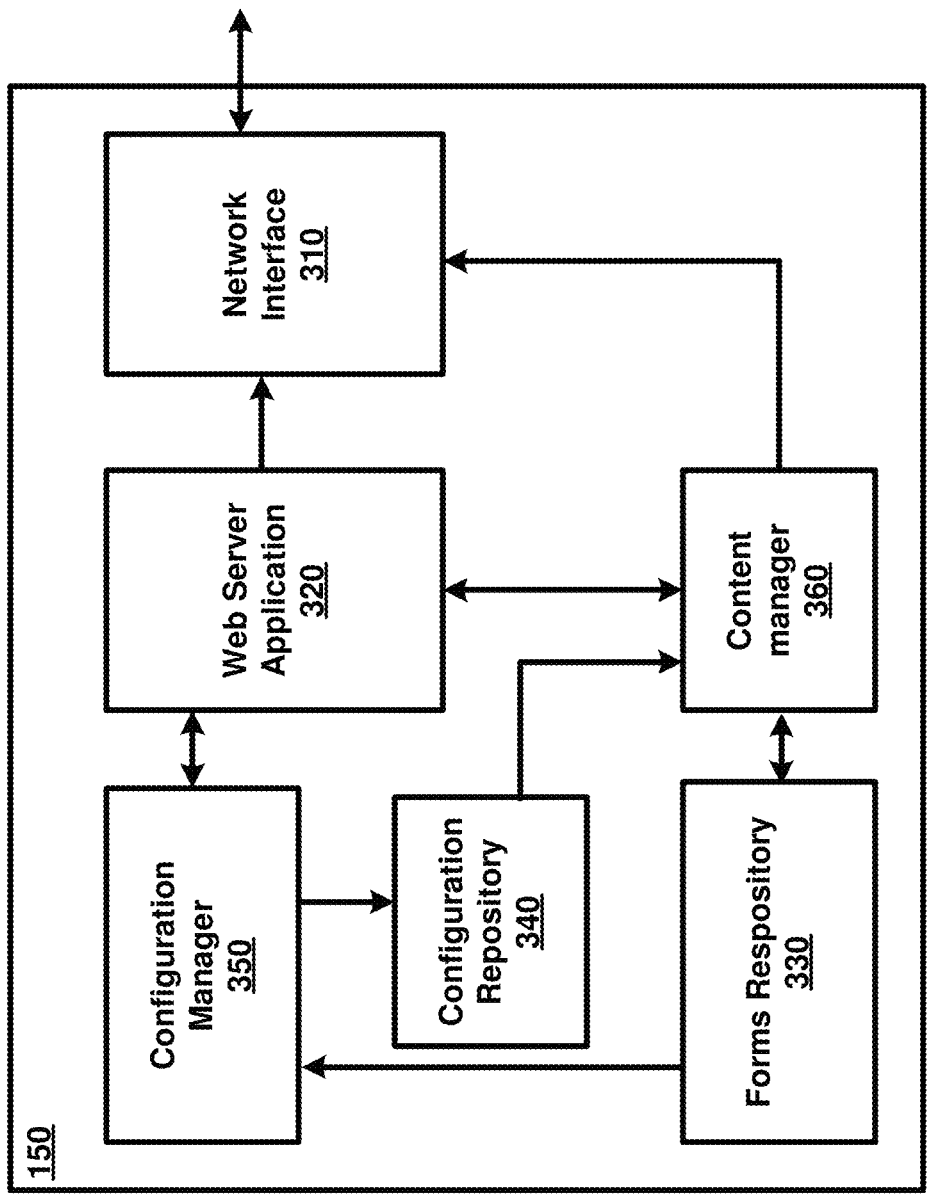
FIG. 3 is a block diagram illustrating the details of a content server in an embodiment.

FIG. 3 is a block diagram illustrating the details of a server system in an embodiment. Content server 150 is shown containing network interface 310, web server application 320, forms repository 330, configuration repository 340, configuration manager 350 and content manager 360. Each block is described below in further detail.

Network interface 310 provides electrical and protocol interfaces (e.g., network cards, network protocol stacks, etc.) to enable various blocks of content server 150 to communicate via network 120. In general, packets directed to content server 150 are examined for forwarding to the appropriate internal block/application. Similarly, network interface 310 sends packets directed to other external systems shown in FIG. 1 (upon receipt of the corresponding packets, with identity of the target system, from the respective block). Network interface 310 may be implemented in a known way.

Forms repository 330 represents a memory storing the definitions of various forms. Some of the forms are served to users at user system 110A, while some may be used by configuration manager 350 to facilitate administrators/users to generate the mapping noted above. Each form definition may specify fields, attributes/operation (e.g., button, list, value) of each field, any association of the fields with respective columns in a table of content server 150 (if the value of the field is to be stored in the corresponding column), etc. The forms may be encoded in conventions such as HTML.

Configuration repository 340 represents a memory storing the mapping noted above, as well as the field-value combinations ("auto-fill information") specified by each profile of the mapping. As described in combination with other blocks, content server 150 causes fields to be auto-filled with corresponding values in the auto-fill information. Web server application 320 provides the user interface component for interaction with users of external systems. Each interaction may be based on HTML pages or custom forms (as in mobile applications), consistent with the implementation at user systems 110A-110D.

Configuration manager 350 enables users/administrators to build configuration repository 340. To facilitate building of mapping data, configuration manager 350 may enable a user to select a form of interest and specify a corresponding gesture(s) on the touch screen. A profile entry is created associated with the specified gesture (as symbols) in the mapping data. To facilitate the auto-fill information for each such entry, configuration manager 350 may examine the definition of the corresponding form (of the profile entry), indicate the fields available in the form for data entry, and enable the user/administrator to specify auto-fill values for specific subset of fields of interest. The corresponding specified values for the subset of fields are stored in configuration repository 340.

Content manager 360 operates in conjunction with other blocks to implement the various content management functions. In relation to an illustrative example of the present disclosure, content manager 360 enables auto-filling of fields of a displayed form with values specified by the corresponding profile, on user performing a corresponding gesture operation on the form. Such auto-filling may be facilitated in various contexts such as when a content file is received (upon creation at user system 110A) or when a user wishes to specify metadata for any file(s) of interest otherwise.

The description is continued with respect to the details of user system 110A in an embodiment.

5. User System

Figure 4:
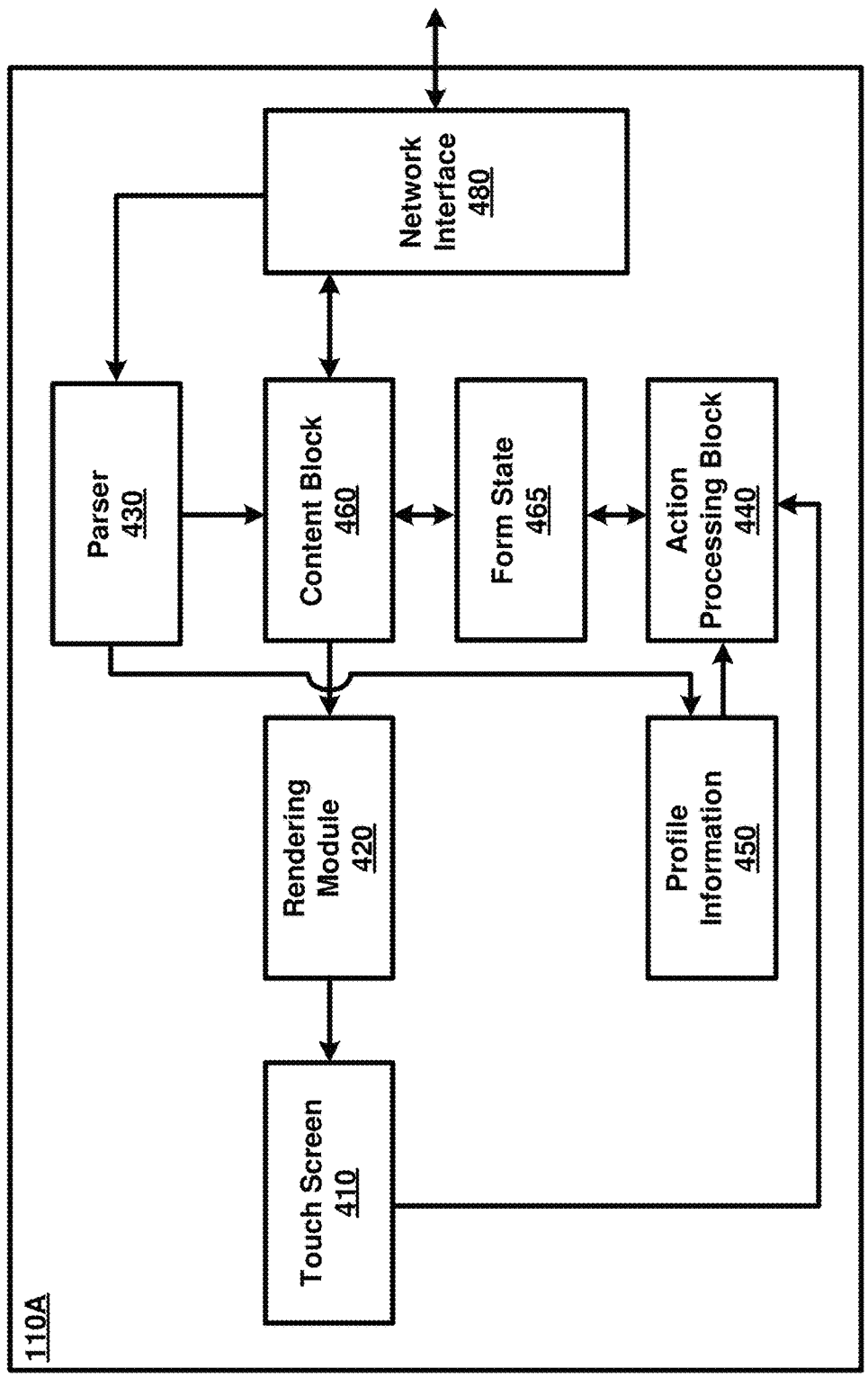
FIG. 4 is a block diagram illustrating the details of a touch screen based computing system in an embodiment.

FIG. 4 is a block diagram illustrating the details of a touch screen based computing system in an embodiment. User system 110A is shown containing touch screen 410, rendering module 420, parser 430, action processing block 440, profile information 450, content block 460, form state 465, and network interface 480. Each block is described below in further detail.

Network interface 480 may be implemented similar to network interface 310, but in the context of the blocks of user system 110A. The specific packets received/sent from/to various blocks will be clear from the description of the other blocks.

Parser 430 receives a form definition, and other information simplifying filling of values into various fields of the form in accordance with several features of the present disclosure. The form definition may be forwarded to content block 460, while the additional information may be stored as profile information 450. Profile information 450 may thus contain both the mapping data, and the auto-fill information for each profile entry in the mapping data.

Rendering module 420 generates display signals for touch screen 410 according to the display content definition received from content block 460. The display content definition reflects the forms received from content server 150, and the various interactions with the user, as described herein. Rendering module 420 may be implemented in a known way.

Profile information 450 represents a memory storing (maintaining) the mapping data and the profile information for each entry in the mapping data, as received from content server 150. Form state 465 also represents a memory storing the definition of a form at a current time instance. Thus, upon receipt of a form definition, the value of various fields can be blank, or as specified in the received definition. However, once the fields are auto-filled in accordance with the features of the present disclosure, form state 465 contains the auto-filled values for the respective fields.

Touch screen 410 displays forms with corresponding fields, and provides data representing any touch actions to action processing block 440. Each touch action may be represented as corresponding parameter values. For example, a tap (single touch) may be specified as a coordinate indicating the centre of the area touched. Operations such as drag, slide and pinch may be specified with a corresponding sequence of values, representing the touch points constituting the operations (including potentially temporal relationship as to points touched).

Action processing block 440 examines the data representing the touch actions performed on touch screen 410, and coordinates appropriate further operations. For example, if a received action indicates a touch at an area represented by 'submit/save' button (per forms state 465), a submit indication may be provided to content block 460. Similarly, any other user actions (e.g., operation of a drop-down menu) are also similarly communicated to content block 460.

On the other hand, upon receiving an indication of receipt of a sequence of touch points (as a gesture) on touch screen 410, action processing block 420 examines profile information 450 to determine a symbol of the mapping matching an input symbol constituted by the touch points. For example, the touch points may be first mapped to an input symbol (e.g., represented by an ASCII/ANSI codes), and thereafter compare the input symbol with those for respective profiles in mapping data. Action processing block 440 thereafter identifies the profile corresponding to the matching/input symbol and determines the auto-fill information of the corresponding profile. Action processing block 440 updates form state 465 to reflect that each field in the auto-fill information is associated with a value specified in the auto-fill information, causing the display of form thereafter with the auto-filled values.

Content block 460 implements the content management functions in cooperation with the other blocks of server system 103. As a part of such functions, content block 460 facilitates users to perform various actions based on forms. For example, content block 460 may be designed to receive a content file from user system 110A, and in response, send a form for a user to provide metadata associated with the file sent for storing. The form may be sent for providing metadata in other contexts as well. Content block 460 may similarly send forms for other content management functions such as searching and classification of files.

Though content block 460 is described as receiving form definitions from content server 150, it may be appreciated that content block 460 can represent user applications (e.g., word processors, spread sheets, custom business applications, etc.) of a standalone application, which generates the content/forms as well for display on touch screen 410. At least in such a situation, some of the blocks (and attendant functions) of FIG. 3 (configuration manager 350 and forms repository 330) may be present in FIG. 4.

Alternatively, user system 110A may be a 'thin' client, in which case some of the blocks of FIG. 4 (e.g., action processing block 440, content block 460, form state 465, etc.) may be present in content server 150. As is well known, thin clients are implemented with minimal functionality and thus many of the functions may be performed in content server 150.

The operation of content block 460, and in general, the manner in which users may be facilitated to enter values into multiple fields of a form, is described below with additional examples.

6. Illustrative Example

FIGS. 5 through 9 together illustrate the manner in which users can enter values into multiple fields of a form in one embodiment. Broadly, FIG. 5 depicts metadata stored associated with respective files. FIG. 6 depicts profiles and associated symbols configured for various users, while FIG. 7 specifies details of some profiles, depicting the fields of interest and values for the fields in an embodiment. FIGS. 8A-8D depicts the manner in which user may enter metadata values associated with respective fields, while FIG. 9 depicts the metadata stored in the tables of a server after a user enters/inputs values into fields of a form, in an embodiment.

FIG. 5 depicts the details of a table (500) in data store 160 in an embodiment. However, in alternative embodiments, the data may be maintained using other data formats such as extensible markup language (XML), as will be apparent to one skilled in the relevant arts by reading the disclosure herein.

Table 500 depicts portions of data representing metadata associated with a corresponding content/file in data store 160. Table 500 is shown containing columns ContentId 515, UserId 520 indicating corresponding identifier of a user, content. FormId 510 indicates associated form for a user to specify values of corresponding fields representing metadata for a content. Columns revision 525, author 530, comments 535, region 540, state 545, city 550, country 555, releasedate 560, expirationdate 565 and contact# 570 together indicate metadata associated with the file.

Accordingly, each of rows 501-503 specifies data values constituting metadata associated with a content. For example, row 501 specifies that a content with identifier "HR_Foreign" has associated metadata values "01" as revision, "HR_USER1" as Author, "INTL_HR_POLICY" as comments, "INTL" as region, "KAR" as state, "BLR" as city, "IN" as country, "May 12, 2011" as releasedate. Data in row 501 also indicates that metadata associated with content "HR_FOREIGN" has been specified using corresponding fields provided in form "FRM_AA_HR" by user "HR_USER1" performing corresponding operations.

The manner in which a user may be provided a form on a touchscreen for performing corresponding operations related to specifying data values constituting the metadata is described below in further details with respect to FIGS. 6-9.

FIG. 6 depicts details of table (600) in data store 160 containing profiles and associated symbols for various users. Table 600 is shown containing corresponding columns userID 610, FormId 620, Gesture/Symbol 630, ProfileId 640 describing each profile.

Rows 601-603 specifies data indicating profiles configured for user with identifier "HR_USER1". User "HR_USER1" is shown configured as having profiles namely "employee—normal", "employee—foreign" and "employee—critical" with associated symbols (provided by means of a sequence of touch points on a touch screen, as described above), while on respective forms namely "FRM_CA-HR", "FRM_AA-HR" and "FRM_CA-HR". Other data rows 604-607 may similarly be explained.

The description is further continued with an illustration of details of profiles, depicting the fields of interest and values of fields in each of the profiles. It should be appreciated that each profile can have different subset of fields of interest and different values for the same field in relation to other profiles.

Figure 7:
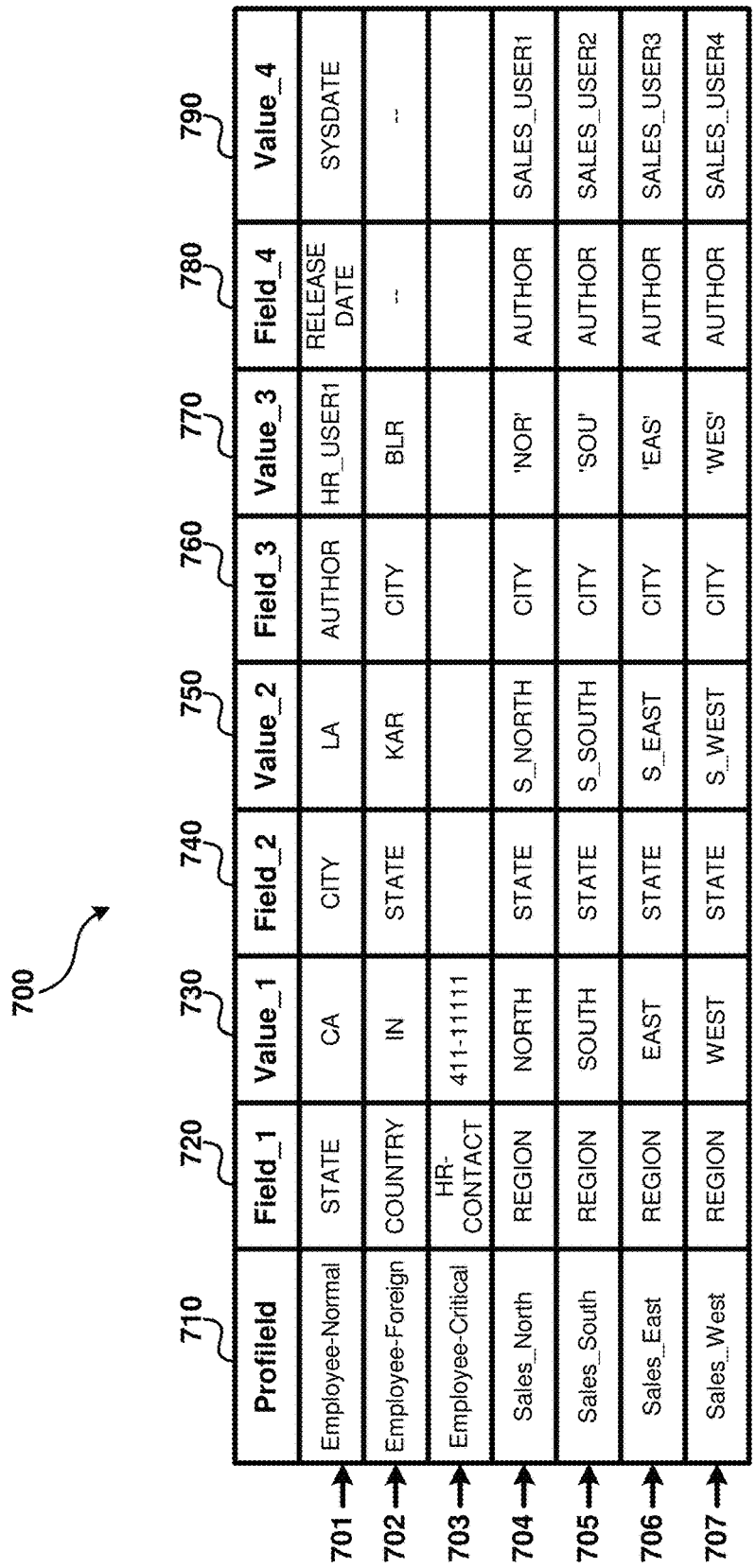
FIG. 7 depicts the details of a profile, depicting the fields of interest and values for the fields, in an embodiment.

FIG. 7 depicts the details of table (700) in data store 160 storing profiles in an embodiment. As specified above, each profile field-value pairs. Accordingly, table 700 is shown containing columns profileId 710, field_1 720, value_1 730, field_2 740, value_2 750, field_3 760, value_3 770, field_4 780 and value_4 790. For illustration, it is assumed that four fields and corresponding values have been associated with a profile, even though any number of fields can be conveniently provided as suitable in the corresponding environment.

The description is continued with an illustration of the manner in which values representing metadata associated with contents may be specified in a form using the information in FIGS. 6 and 7.

7. Graphical User Interface

Figures 8C, 8D:
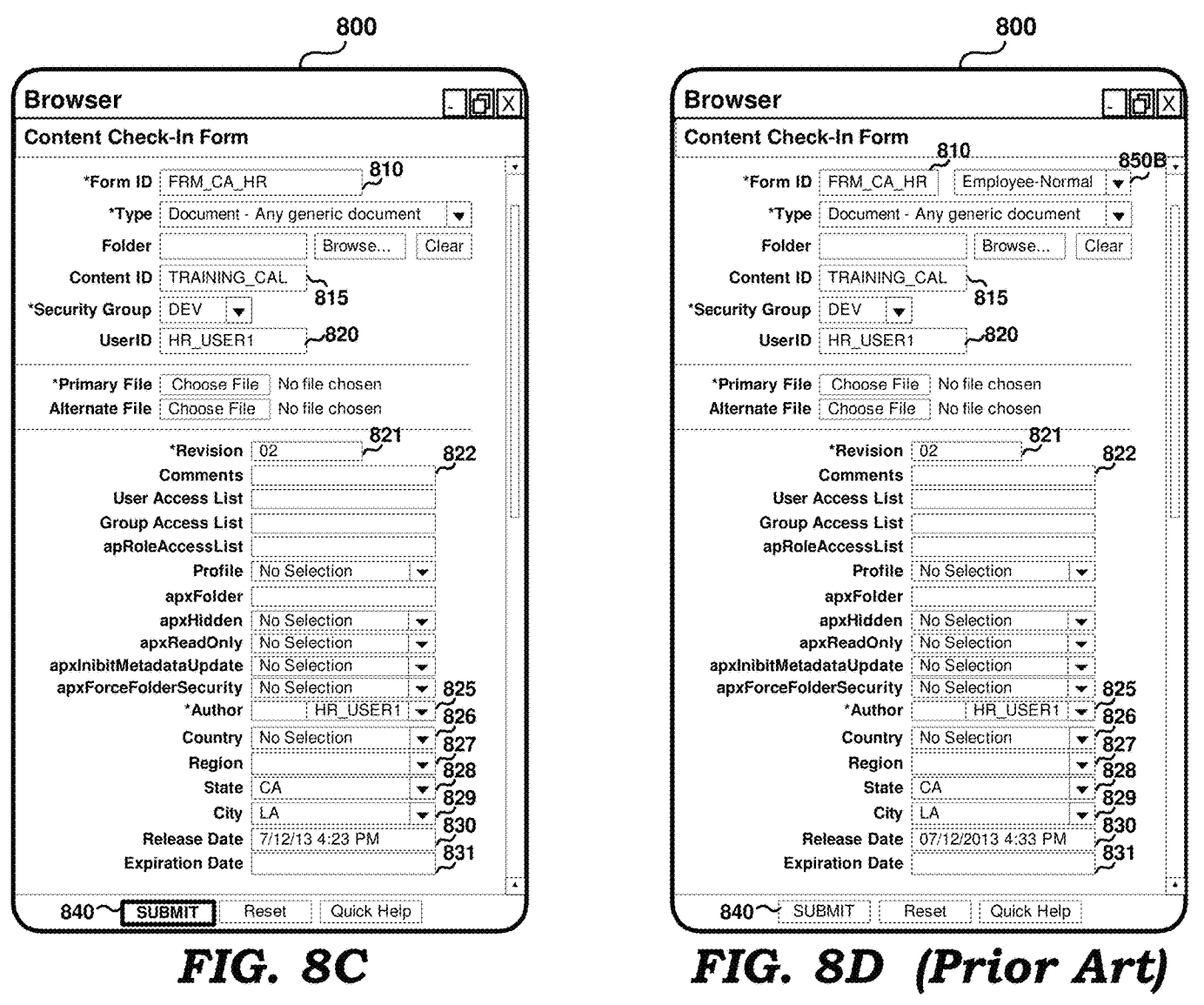

FIGS. 8A through 8C depicts a form displayed on a touch screen at a corresponding time instance of a sequence of time instances in one embodiment. Display area 800 depicts a portion of the user interface to display a form on a touch screen in the present embodiment.

FIG. 8A depicts a form displayed to a user on a touch screen initially. Display portion 810 specifies identifier of the form displayed on the touch screen. In the present example environment, the identifier associated with the form is "FRM_CA_HR" and a user with identifier "HR_USER1" (820) is shown using the form for specifying values representing metadata for a content with identifier "TRAINING_CAL" (815). Accordingly, the form is shown containing corresponding fields in display portions 821-822 and 825-831 labeled "revision" (821), comments (822), author (825), country (826), region (827), state (828), city (829), release date (830) and expiration date (831) for a user to provide corresponding values.

FIG. 8B depicts a touch based gesture provided as an input by a user in an embodiment. It may be observed that the user has specified a sequence of touch points that represents a corresponding symbol "α" (ALPHA) in display portion 850A. As described above, on receiving such a sequence of touch points, action processing block 440 examines data in column 630 to determine corresponding profile (employee-normal) in row 601 for input symbol "α" (ALPHA) by user "HR_USER1" on form "FRM_CA_HR". Action processing block 440 accordingly accesses row 701, to auto-fill the values of some of the fields specified there.

FIG. 8C depicts the values (auto) filled into the fields of the form, in response to the gesture "a" associated with form "FRM_CA_HR" for user "HR_USER1". In accordance with values in row 701, corresponding values of fields with labels state (828), city (829), author (825) and release date (830) are shown auto-filled. Upon selection of submit 840, the values in the form of FIG. 8C are stored in table 500, as depicted by the added row 904 in FIG. 9.

FIG. 8D depicts an alternative approach for similar effect. User is shown to have manually selected a profile 'Employee-Normal' by operation of list-button 850B (containing all the profiles in column 640/710). The same values as in FIG. 8C are shown to be auto-filled. It may be appreciated that FIG. 8B provides a more convenient approach (especially on small touch screens) compared to FIG. 8D, in view of the ability to select profiles based on gestures.

It should be further appreciated that the features described above can be implemented in various embodiments as a desired combination of one or more of hardware, software, and firmware. The description is continued with respect to an embodiment in which various features are operative when the software instructions described above are executed.

8. Digital Processing System

Figure 10:
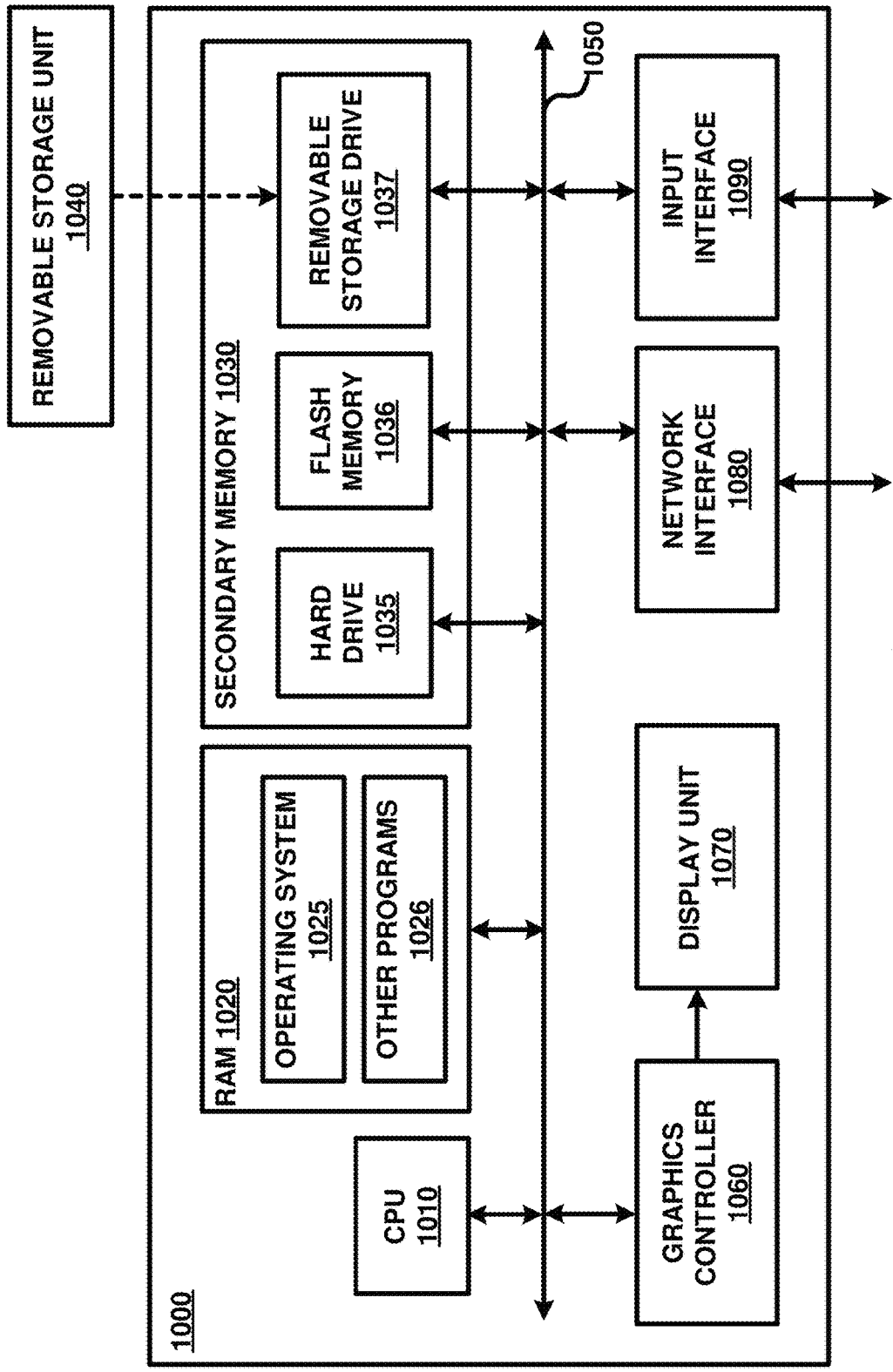
FIG. 10 is a block diagram illustrating the details of a digital processing system in which various aspects of the present disclosure are operative by execution of appropriate software instructions.

FIG. 10 is a block diagram illustrating the details of digital processing system 1000 in which various aspects of the present disclosure are operative by execution of appropriate software instructions. Digital processing system 1000 may correspond to content server 150 or user system 110A. Digital processing system 1000 may contain one or more processors such as a central processing unit (CPU) 1010, random access memory (RAM) 1020, secondary memory 1030, graphics controller 1060, display unit 1070, network interface 1080, and input interface 1090. All the components except display unit 1070 may communicate with each other over communication path 1050, which may contain several buses as is well known in the relevant arts. The components of FIG. 10 are described below in further detail.

CPU 1010 may execute instructions stored in RAM 1020 to provide several features of the present disclosure. CPU 1010 may contain multiple processing units, with each processing unit potentially being designed for a specific task. Alternatively, CPU 1010 may contain only a single general-purpose processing unit.

RAM 1020 may receive instructions from secondary memory 1030 using communication path 1050. RAM 1020 is shown currently containing software instructions constituting operating system 1025 and/or other code/programs 1026 (such as client applications, Web browser, application instances processing client requests, RDBMS, etc.). In addition to operating system 1025, RAM 1020 may contain other software programs such as device drivers, virtual machines, etc., which provide a (common) run time environment (1025) for execution of other code/programs 1026 (including the respective blocks depicted in FIGS. 3 and 4 above for respective systems).

Graphics controller 1060 (including touch screen controller in case of user system 110A) generates display signals (e.g., in RGB format) to display unit 1070 based on data/instructions received from CPU 1010. Display unit 1070 contains a display screen (touch screen in case of user system 110A) to display the images defined by the display signals. Input interface 1090 may correspond to a keyboard and a pointing device (e.g., touch-pad, mouse) and may be used to provide inputs. Network interface 1080 provides connectivity to a network (e.g., using Internet Protocol), and may be used to communicate with other systems (such as those shown in FIG. 1) connected to the network.

Secondary memory 1030 may contain hard drive 1035, flash memory 1036, and removable storage drive 1037. Secondary memory 1030 may store the data (e.g., configured rules) and software instructions (e.g. for performing the actions of FIG. 2), which enable digital processing system 1000 to provide several features in accordance with the present disclosure.

Some or all of the data and instructions may be provided on removable storage unit 1040, and the data and instructions may be read and provided by removable storage drive 1037 to CPU 1010. Floppy drive, magnetic tape drive, CD-ROM drive, DVD Drive, Flash memory, removable memory chip (PCMCIA Card, EPROM) are examples of such removable storage drive 1037.

Removable storage unit 1040 may be implemented using medium and storage format compatible with removable storage drive 1037 such that removable storage drive 1037 can read the data and instructions. Thus, removable storage unit 1040 includes a computer readable (non-transitory storage) medium having stored therein computer software and/or data. However, the computer (or machine, in general) readable medium can be in other forms (e.g., non-removable, random access, etc.).

In this document, the term "computer program product" is used to generally refer to removable storage unit 1040 or hard disk installed in hard drive 1035. These computer program products are means for providing software to digital processing system 1000. CPU 1010 may retrieve the software instructions, and execute the instructions to provide various features of the present disclosure described above.

Reference throughout this specification to "one embodiment", "an embodiment", or similar language means that a particular feature, structure, or characteristic described in connection with the embodiment is included in at least one embodiment of the present disclosure. Thus, appearances of the phrases "in one embodiment", "in an embodiment" and similar language throughout this specification may, but do not necessarily, all refer to the same embodiment.

Furthermore, the described features, structures, or characteristics of the disclosure may be combined in any suitable manner in one or more embodiments. In the above description, numerous specific details are provided such as examples of programming, software modules, user selections, network transactions, database queries, database structures, hardware modules, hardware circuits, hardware chips, etc., to provide a thorough understanding of embodiments of the disclosure.

9. Conclusion

While various embodiments of the present invention have been described above, it should be understood that they have been presented by way of example only, and not limitation. Thus, the breadth and scope of the present invention should not be limited by any of the above-described exemplary embodiments, but should be defined only in accordance with the following claims and their equivalents.

It should be understood that the figures and/or screen shots illustrated in the attachments highlighting the functionality and advantages of the present disclosure are presented for example purposes only. The present disclosure is sufficiently flexible and configurable, such that it may be utilized in ways other than that shown in the accompanying figures.

Further, the purpose of the following Abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The Abstract is not intended to be limiting as to the scope of the present disclosure in any way.

What is claimed is:

1. A method of facilitating user of touch screens to provide values for fields of forms, said method being performed in a user system, said method comprising:

communicating with a server system to cause said server system to send a form of a plurality of forms for filling by a user, wherein said server system maintains for each user and each form of a corresponding set of forms desired by the user, a respective mapping of each of a respective plurality of symbols to corresponding one of a plurality of profiles, wherein each of said plurality of profiles specifies a respective value for each of a corresponding set of fields of the form for the user, said form containing a plurality of fields, each of said set of fields being contained in said plurality of fields;

receiving from said server system, said form and a mapping corresponding to said form and said user, said form being for display on a touch screen of said user system, wherein said form, including said plurality of fields, are displayed on said touch screen, wherein said form is displayed on said touch screen with a first set of fields of said plurality of fields being displayed with respective values of a first set of values;

receiving a sequence of touch points on said form while said form is displayed on said touch screen with said first set of fields set to respective values of said first set of values, wherein said sequence of touch points represent an input symbol;

examining said mapping received from said server system to determine a first symbol matching said input symbol, and a first profile corresponding to said first symbol, wherein said first profile specifies respective values of a second set of values for said first set of fields of said plurality of fields;

auto-filling said first set of fields displayed on said touch screen with respective values of said second set of values specified by said first profile such that said form is thereafter displayed on said touch screen with said second set of values being respectively displayed in place of said first set of values for said first set of fields on said touch screen, wherein said first set of fields contain at least two fields, wherein said examining and said auto-filling are performed in response to said receiving of said sequence of touch points;

receiving, after said auto-filling, an action associated with said form; and performing said action based on values present in said plurality of fields of said form.

2. The method of claim 1, wherein said action comprises a submit action performed by a user on said touch screen, and the values in said form at said performance of said submit action are sent in response to said submit action.

3. The method of claim 2, wherein said server system comprises a content server, wherein the values in said form at said performance of said submit action are sent to said content server in response to said submit action.

4. The method of claim 3, wherein said user system sends to said content server a file for storing, wherein said user system receives said form and said mapping in response to sending said file, wherein said plurality of fields are for entry of respective meta data in relation to said file.

5. The method of claim 4, wherein said content server maintains respective plurality of profiles associated with each of a plurality of users, wherein said receiving receives the plurality of profiles of a user for whom said form is previously received.

6. The method of claim 5, wherein said values in said first profile are auto-filled as default values for said first set of fields of said form, wherein said user is enabled to edit each of said first set of fields prior to performing said action associated with said field.

7. The method of claim 1, wherein said user system receives said mapping along with said form upon interfacing with said server system, wherein said examining is performed in an action processing block executed in a run-time environment, wherein said run-time environment is designed to execute many software programs including said action processing block, said action processing block receiving said sequence of touch points and determining that said first symbol matches said input symbol by examining said mapping.

8. The method of claim 1, wherein said form comprises a list option containing said plurality of profiles, wherein said list option is operable to facilitate an alternative approach for said user to select said first profile while said form is displayed, wherein said auto-filling is performed in response to said user selecting said first profile using said list option.

9. A non-transitory machine readable medium storing one or more sequences of instructions for causing a user system to facilitate a user of touch screens to provide values for fields of forms, wherein execution of said one or more sequences of instructions by one or more processors contained in said user system causes said user system to perform the actions of:

receiving from a server system on a network, a form and a mapping of each of a plurality of symbols to corresponding one of a plurality of profiles, wherein each of said plurality of profiles specifies a respective value for each of a corresponding set of fields of said form, said form containing a plurality of fields, each of said set of fields being contained in said plurality of fields, said form being received, from said server system, for display on a touch screen of said user system, wherein said form, including said plurality of fields, are displayed on said touch screen, wherein said form is displayed on said touch screen with a first set of fields of said plurality of fields being displayed with respective values of a first set of values;

receiving a sequence of touch points on said form while said form is displayed on said touch screen with said first set of fields set to respective values of said first set of values, wherein said sequence of touch points represent an input symbol;

examining said mapping received from said server system to determine a first symbol matching said input symbol, and a first profile corresponding to said first symbol, wherein said first profile specifies respective values of a second set of values for said first set of fields of said plurality of fields;

auto-filling said first set of fields displayed on said touch screen with respective values of said second set of values specified by said first profile such that said form is thereafter displayed on said touch screen with said second set of values being respectively displayed in place of said first set of values for said first set of fields on said touch screen, wherein said first set of fields contain at least two fields, wherein said examining and said auto-filling are performed in response to said receiving of said sequence of touch points;

receiving, after said auto-filling, an action associated with said form; and performing said action based on values present in said plurality of fields of said form.

10. The non-transitory machine readable medium of claim 9, wherein said sequence of touch points represent a character of alphabet written on said touch screen when said form is displayed on said touch screen, wherein said action comprises a submit action performed by a user on said touch screen, and the values in said form at said performance of said submit action are sent in response to said submit action.

11. The non-transitory machine readable medium of claim 10, wherein said server system comprises a content server, wherein the values in said form at said performance of said submit action are sent to said content server in response to said submit action.

12. The non-transitory machine readable medium of claim 11, wherein said user system sends to said content server a file for storing, wherein said user system receives said form and said mapping in response to sending said file, wherein said plurality of fields are for entry of respective meta data in relation to said file.

13. The non-transitory machine readable medium of claim 12, wherein said content server maintains respective plurality of profiles associated with each of a plurality of users, wherein said receiving receives the plurality of profiles of a user for whom said form is previously received.

14. The non-transitory machine readable medium of claim 13, wherein said values in said first profile are auto-filled as default values for said first set of fields of said form, wherein said user is enabled to edit each of said first set of fields prior to performing said action associated with said field.

15. A server system comprising:
a memory to store instructions;
a processor to retrieve and execute said instructions, wherein execution of said instructions causes performance of the actions of:

maintaining for each user of a plurality of users a mapping of each of a plurality of symbols to corresponding one of a plurality of profiles, wherein each of said plurality of profiles specifies a respective value for each of a corresponding set of fields of said form, said form containing a plurality of fields, each of said set of fields being contained in said plurality of fields, said form, from said server system, being received for display on a touch screen of said user system, wherein said form, including said plurality of fields, are displayed on said touch screen, wherein said form is displayed on said touch screen with a first set of fields of said plurality of fields being displayed with respective values of a first set of values;

receiving from said server system, a sequence of touch points on said form while said form is displayed on said touch screen with said first set of fields set to respective values of said first set of values, wherein said sequence of touch points represent an input symbol;

examining said mapping received from said server system to determine a first symbol matching said input symbol, and a first profile corresponding to said first symbol, wherein said first profile specifies respective values of a second set of values for said first set of fields of said plurality of fields;

auto-filling said first set of fields displayed on said touch screen with respective values of said second set of values specified by said first profile such that said form is thereafter displayed on said touch screen with said second set of values being respectively displayed in place of said first set of values for said first set of fields on said touch screen, wherein said first set of fields contain at least two fields, wherein said examining and said auto-filling are performed in response to said receiving of said sequence of touch points;

receiving, after said auto-filling, an action associated with said form; and performing said action based on values present in said plurality of fields of said form.

16. The digital processing system of claim 15, wherein said action comprises a submit action performed by a user on said touch screen, and the values in said form at said performance of said submit action are sent in response to said submit action.

17. The digital processing system of claim 16, wherein said server system comprises a content server, wherein the values in said form at said performance of said submit action are sent to said content server in response to said submit action.

18. The digital processing system of claim 17, wherein said digital processing system comprises a user system, wherein said user system sends to said content server a file for storing, wherein said user system receives said form and said mapping in response to sending said file, wherein said plurality of fields are for entry of respective meta data in relation to said file.

19. The digital processing system of claim 18, wherein said content server maintains respective plurality of profiles associated with each of a plurality of users, wherein said receiving receives the plurality of profiles of a user for whom said form is previously received.

20. The digital processing system of claim 19, wherein said values in said first profile are auto-filled as default values for said first set of fields of said form, wherein said user is enabled to edit each of said first set of fields prior to performing said action associated with said field.

* * * * *

UNITED STATES PATENT AND TRADEMARK OFFICE
CERTIFICATE OF CORRECTION

PATENT NO. : 10,445,417 B2
APPLICATION NO. : 13/956396
DATED : October 15, 2019
INVENTOR(S) : Dhanawat et al.

Page 1 of 1

It is certified that error appears in the above-identified patent and that said Letters Patent is hereby corrected as shown below:

On the Title Page

Item (73), add:
-- (73) Assignee: Oracle International Corporation, Redwood Shores, CA (US) --.

In the Drawings

On sheet 3 of 11, in FIG. 3, under Reference Numeral 330, Line 2, delete "Respository" and insert -- Repository --, therefor.

In the Claims

In Column 14, Line 1, in Claim 15, delete "server system" and insert -- digital processing system --, therefor.

Signed and Sealed this
Thirteenth Day of October, 2020

Andrei Iancu
*Director of the United States Patent and Trademark Office*